Dec. 17, 1940.  D. B. DEWEY  2,225,209
MOTOR COOLING CONTROL
Filed Nov. 18, 1938  2 Sheets-Sheet 1
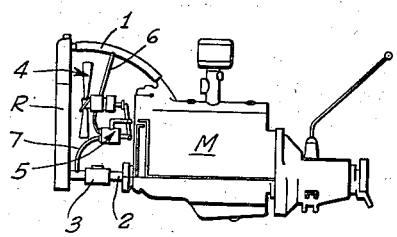
Fig. 1.
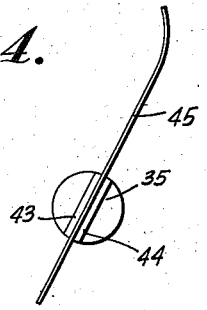
Fig. 4.
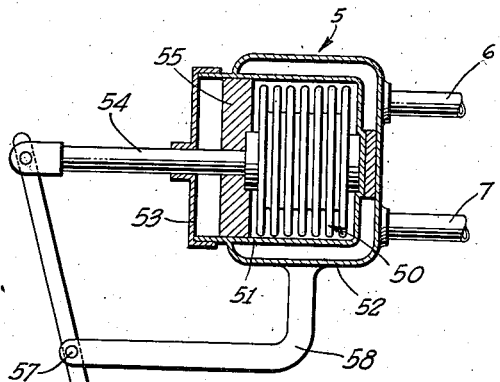
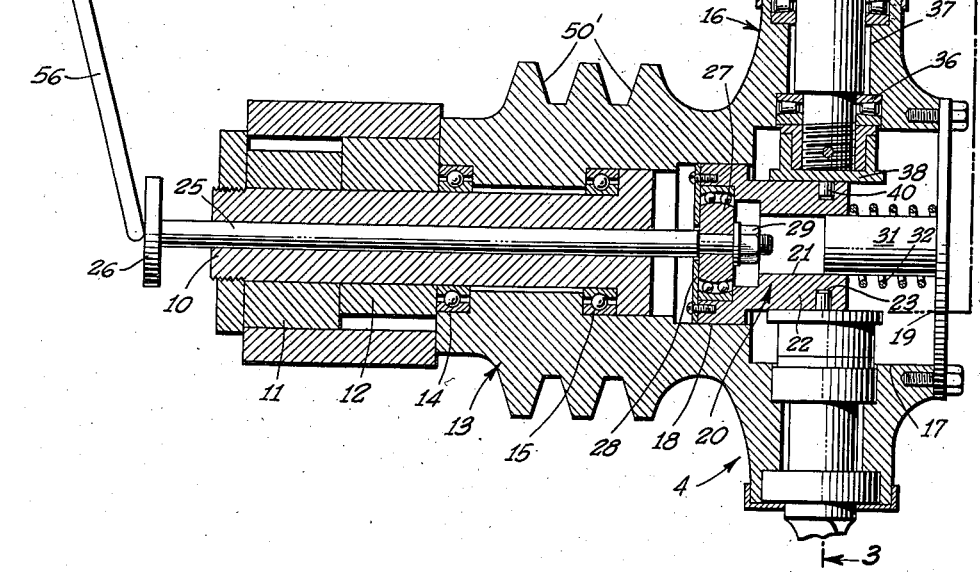
Fig. 2.
DAVID BRAINARD DEWEY
INVENTOR.
BY
ATTORNEY.

Dec. 17, 1940.         D. B. DEWEY         2,225,209
MOTOR COOLING CONTROL
Filed Nov. 18, 1938         2 Sheets-Sheet 2
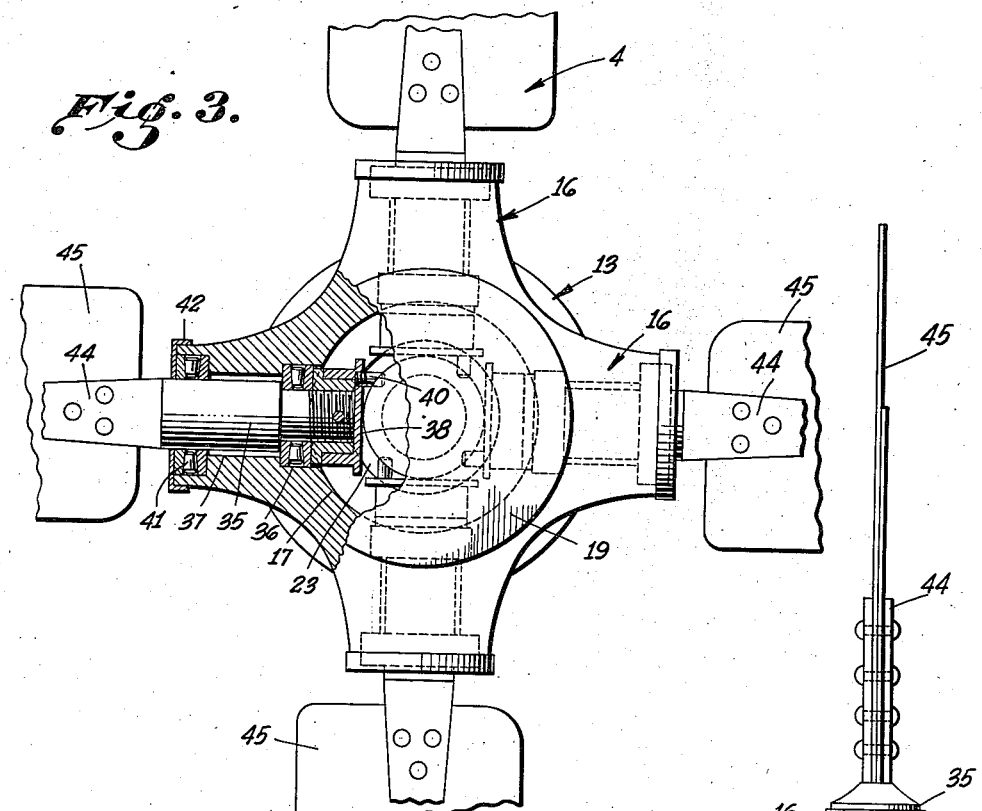
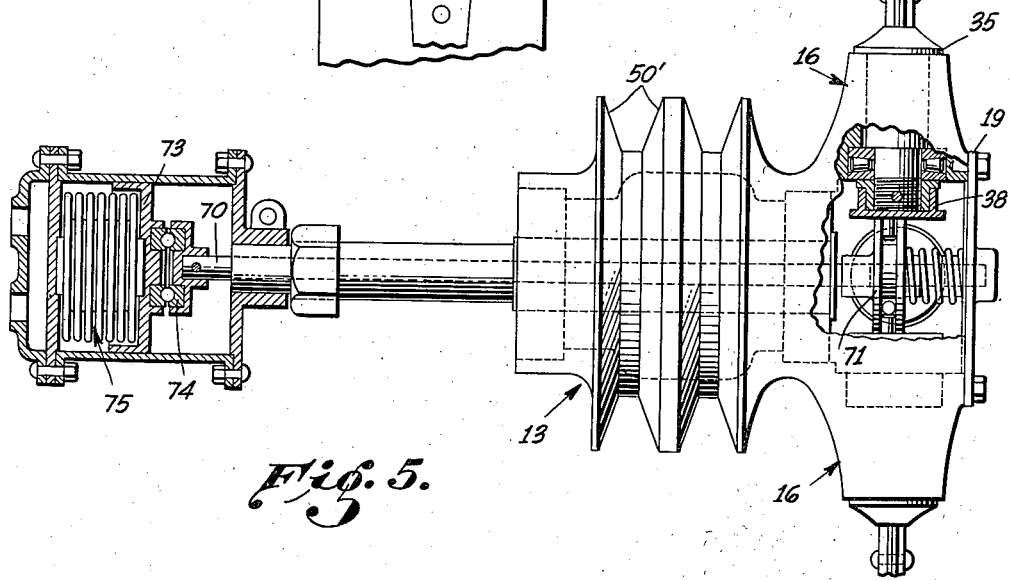
DAVID BRAINARD DEWEY
INVENTOR.
BY
ATTORNEY.

Patented Dec. 17, 1940

2,225,209

UNITED STATES PATENT OFFICE 2,225,209

MOTOR COOLING CONTROL

David Brainard Dewey, Pasadena, Calif.

Application November 18, 1938, Serial No. 241,203

3 Claims. (Cl. 170—163)

This invention pertains to improvements in motor controls, particular reference being made to the control of internal combustion engines, Diesel and semi-Diesel motors, and other engines or motors of a type requiring the provision of cooling means, whereby said motors or engines are maintained within an effective operating temperature range in an automatic manner.

The motors or engines used in trucks, tractors, power shovels, passenger busses, power plants and industrial units such as derricks, etc., are ordinarily provided with a liquid cooling system comprising a radiator and a pump for regulating the cooling liquid around the motor and then through the radiator. Fans are provided, such fans being driven by the motor or engine, for passing cooling air through the radiator or around the cylinders for the purpose of reducing the temperature thereof, such means being particularly designed to prevent the motor from overheating. During winter months, such cooling system will ordinarily cool the motor to below a desired effective working range and additional devices, such as adjustable louvres, are ordinarily positioned around the radiator for the purpose of preventing cooling air from being sucked or blown through the radiator when the air temperature is so low that an inordinately low temperature exists in the cooling liquid. It is to be noted, however, that the fans are constantly driven as long as the motor is being operated. On large trucks it has been found that a very appreciable amount of power is consumed in driving the fan. A truck engine of 100 horsepower rating may, at top engine speed, expend 20 horsepower in driving the fan.

The present invention permits the maintenance of an effective operating temperature in the motor without the necessity of employing additional louvres, shutters, or the like, and furthermore reduces the amount of power necessary to drive a fan.

Generally stated, the present invention is directed toward a method whereby a motor is maintained within an effective operating temperature range by varying the pitch of the fan blades in accordance with the temperature of the motor or of the motor cooling liquid. The invention also pertains to a combination of elements whereby the method may be carried out most effectively.

It is an object of the present invention, therefore, to provide a method of maintaining a motor or engine within an effective operating temperature range in an automatic manner.

A further object is to provide, in combination with a motor provided with a cooling system including a radiator, fan means provided with angularly adjustable blades.

An object of the present invention is to provide the combination of a fan provided with angularly adjustable blades and means controlled and actuated by temperature variations in a radiator, lubricating oil stream, cooling liquid or motor temperature, for adjustably positioning said blades.

A still further object of the present invention is to disclose and provide particular means and combinations of elements whereby the devices of the invention may be most effectively carried out.

In order to facilitate understanding of these and other objects of the invention, reference will be had to the appended drawings in which certain illustrative forms are shown, it being understood that various changes and modifications can be made from the specific forms illustrated without departing from the general teachings of the invention. In such drawings:

Fig. 1 is a diagrammatic side elevation of a motor provided with a cooling system and the means of this invention.

Fig. 2 is a side view, partly in section, through one form of device.

Fig. 3 is a front view and transverse section taken along the plane III—III of Fig. 2.

Fig. 4 is a section through a fan blade.

Fig. 5 represents a modified form of device.

As shown in Fig. 1, a motor M may be provided with a cooling fluid system including a radiator R, a hose conduit I connecting the upper portion of the water passages of the motor with the top of the radiator and a conduit 2 connecting the lower portion of the radiator with the lower portion of the motor jacket. This lower conduit 2 may be provided with a driven pump 3 which maintains circulation of the cooling fluid from the radiator into the motor. A cooling fan is indicated generally at 4. The fan 4 as well as the pump 3 is ordinarily driven by the motor.

When a unit of the type shown in Fig. 1 is installed in a vehicle or in any power plant, the fan 4 either sucks or blows air through the radiator R, the speed of the fan 4 varying with the speed of the motor, air being thus passed through the radiator R for the purpose of cooling the liquid which is being circulated therethrough. The fans on trucks and similar large installations may have an outer diameter of two feet and a considerable amount of power is used in rotating the fan. As stated heretofore, in many instances from 15 to 25 horsepower are needed simply for the purpose of driving the fan and this expenditure of energy takes place whether wholly necessary or not. For example, during winter months or when a truck is going down a long grade, it is not necessary to pass large quantities of air through the radiator since the motor is relatively cool. The pitch of the fan blades is set, however, to deliver a quantity of air through the radiator sufficient to cool the liquid therein under maximum load conditions as, for example, where the truck is being operated up long grades in the summer. Obviously, such fan capacity is not necessary or needed during winter months nor when the truck is operating on the level or down grade. The horsepower requirements of the fan do not change, however, and unnecessarily large quantities of power are thus wasted. Moreover, when the motor or truck is operating under favorable or cool conditions, the fan capacity is materially in excess of that desired and the cooling system drops in temperature to below a temperature at which the motor operates most effectively.

In accordance with the present invention, temperature sensitive means, generally indicated at 5, are connected as by means of a line 6 to the conduit 1 and by a line 7 to the inlet side of the pump 3 so that a portion of the cooling fluid passes through conduit 6 into the temperature responsive device 5 and then through line 7 and pump 3 back into the motor. The temperature responsive device 5 is operably associated with the fan 4 and the fan 4 is, in accordance with this invention, so constructed that the pitch or angle of the fan blades is automatically varied or adjusted in accordance with the temperature of the cooling liquid, such adjustment being automatically made by the device 5.

As shown in Fig. 2, the fan assembly may comprise a hollow stationary stud shaft 10 which is firmly held as by means of a bracket (not shown) encircling the eccentric adjustment rings 11 and 12. The bracket is attached to some stationary support and the adjustment rings 11 and 12 permit the shaft 10 to be properly positioned with respect to driving pulleys or sheaves.

Rotatably mounted upon the stud shaft 10 is a hollow hub 13, suitable bearings being indicated at 14 and 15. The hollow hub 13 is provided with two, three or four radially extending bosses 16. Preferably the hub 13 is provided with bores 17 and 18 which are axial with respect to the stud shaft 10 and which are of different diameters. The open end of the hub 13 may be provided with a closure plate 19.

Slidably mounted within the bores 18 of the hub 13 may be a collar 20. Such collar is preferably provided with a hollow bore 21 and a cylindrical end portion 22 carrying on its outside surface a diametric groove, indicated at 23.

Extending through the hollow stud shaft 10 is an actuating pin 25 provided with an external head 26, this actuating pin being rotatably and slidably mounted within the hollow stud shaft 10. The inner end of this actuating pin 25 is connected to the collar 20 in such manner as to permit rotation of the collar 20 around the pin 25, longitudinal movement of such pin resulting in longitudinal movement of the collar 20. The form of connection may vary materially but as shown in Fig. 2 may include a bearing 27, a retaining ring 28 pinned onto the collar 20 and lock nut means 29.

The inner end of the collar 20 may be caused to abut the shoulder formed within the hub 13 as, for example, where the bores 17 and 18 of said hub form a flange, the collar 20 being thereby limited in its inward movement by such inwardly extending flange. Inward movement of such collar 20 may be facilitated somewhat by means of a spring 32 bearing upon the top of such collar 20 and surrounding a centering pin 31 carried by the cover plate 19.

Each of the radially extending bosses 16 is provided with a radial bore adapted to receive a fan blade stud, such as the stud 35. In the embodiment illustrated, the radial bore of the boss is stepped, the inner bore 36 being of larger diameter than the outer bore 37. The inner bore 36 may be provided with a bearing surrounding the inner end of the fan blade stud 35. Such inner end of the fan blade stud 35 may carry a cap 38 provided with a pin 40 which is eccentrically positioned with respect to the axis of the fan blade stud 35. The cap 38 may be pinned onto the end of the stud. An additional bearing, indicated at 41, may surround the outer end of the stud 35 and be retained in place as by means of a cap 42 threadedly attached to the boss 16.

Each of the fan blade studs 35 carries a fan blade 45 which is firmly retained between the bifurcated end portions 43 and 44 of the stud 35. The fan blade 45 may be made from a single piece of metal or from a plurality of members. In the preferred construction the leading or entering edge of the fan blade is forwardly bent or inclined whereas the major portion of the blade is straight. The curved or inclined portion of the blade may comprise from about one-fourth to one-third of the total width of the blade. The axial center of the stud 35 preferably extends along the blade at a point corresponding to about one-third of the total width of the blade from the trailing edge thereof. In other words, the fan blade 45 is so held between the bifurcated portions 43 and 44 that approximately two-thirds of the fan blade width is in advance of an extension of the axis of the fan blade stud 35.

The eccentrically positioned pins 40 mounted on the inner ends of the fan blade studs 35 slidably engage with the groove 23 formed in the collar 20. It is to be noted that when the hub 13 is rotated (as by means of chains or belts passing over the grooves 50 formed in the hub) the collar 20 may or may not rotate, said collar being free to either rotate or remain stationary within the bore 18 of the hub 13. The actuating pin 25 may or may not rotate but can move longitudinally or axially. The pins 40 may travel within the circumferential groove 23 formed in the collar 20. The pitch or inclination of the fan blades 45 can be varied at any time by axial movement of the actuating pin 25, which axial movement will cause a corresponding axial movement of the collar 40, movement of such collar 40 causing a partial rotation of the fan blade studs 35 within the bosses 16 of the rotating hub 13.

Means are provided for automatically changing the pitch or inclination of the fan blades 45 in accordance with the temperature of the motor or cooling system associated therewith. Such means may, for example, comprise a Sylphon-type thermostat 50 (generally consisting of an accordion-like, hollow, sealed diaphragm device containing a suitable, readily expandible fluid) positioned within a stationary housing 51 surrounded by a jacket 52. Such jacket is appropriately connected to the conduits or lines 6 and 7 so as to permit cooling liquid to pass through the passageways of the jacket surrounding the housing 51. The housing 51 is provided with a removable cover 53. A plunger 54 provided with a bearing plate 55 resting on top of the Sylphon 50 extends from the housing 51, the end of the plunger 54 being provided with a yoke pivotally connected to a lever 56, said lever being also pivotally connected as at 57 to a bracket 58. The end of the lever 56 rests against the end plate 26 of the actuating pin 25.

The arrangement specifically described operates in the following manner:

In the event the motor is cold (below effective operating temperature) the Sylphon 50 is in contracted position and the major portion of the fan blades 45 lie in a plane transverse to the axis of the hub 13, i. e., they will not be pitched. As a matter of fact, the slight forward inclination of the leading edge of the fan blades 45 will have a tendency to blow some air through the radiator and in the event the radiator is positioned in the forward part of a vehicle immediately in front of a motor, some air will be gently blown from around the motor toward the radiator, thereby retarding the passage of cold outside air through the radiator. The ability of the fan blades to actually blow air from the motor through the radiator (in a direction opposed to the flow of air under normal conditions) permits the motor to warm up more quickly in the morning and maintains the motor at efficient temperatures during cold weather without the use of auxiliary radiator shutters, etc. Furthermore, it will be noticed that this reversal in flow is obtained by changes in the pitch of the blade 45 entirely to one side of a transverse rotational plane which would be established by the main flat portion of the blade 45. Under such conditions, very little power is spent in driving the hub 13 and the fan blade since very little resistance is encountered. If, for example, the truck is coasting down a long grade or driving along a level road when the outside air temperatures are low, the power generated by the motor is most effectively utilized for propulsion and not spent in uselessly rotating a steeply pitched fan.

In the event, however, the truck on which the device of this invention is installed is climbing a steep grade which requires the motor to be operated at high speed while the vehicle is in low gear, the motor temperature will quickly rise and as the cooling liquid becomes hot, the Sylphon 50 will be caused to expand, exert pressure on the plunger 54 and move the lever 56 so as to axially adjust the actuating pin 25 which in turn varies the pitch of the fan blades 45. As the pitch of the fan blades 45 increases, larger quantities of cooling air are either blown or sucked through the radiator, thereby more effectively cooling the cooling system and liquid and tending to maintain the motor within an effective operating temperature range.

In a slightly modified form of operation (particularly when fan blades of the type illustrated are used), the Sylphon exerts an expansive force even at low temperatures of say 130° F. so that when the motor is idling (a condition under which rapid rise in temperature is ordinarily observed), the expansive force of the Sylphon will place the fan blades at an appreciable pitch angle and thereby prevent undue rise in temperature. If the motor (still at 130° F.) is run at high speed, the fan blades will flatten out due to air resistance and will overcome the pressure of the Sylphon, thereby preventing overcooling. In other words, the Sylphon may be adjusted to generate pressure at any desired temperature, depending upon the type of operation desired, and in some instances need not generate any pressure until temperatures of 160° F.–180° F. are reached.

It is to be understood that although in Fig. 1 the cooling liquid is shown by-passed through the temperature responsive device 5 from the radiator inlet conduit to the circulating pump inlet, the cooling fluid which is passed through the jacket of the device may be routed or by-passed in other ways.

In the modified form of device a rotatable actuating shaft 70 extends through the shaft on which the hub 13 is mounted, the inner end of such shaft carrying a pitch regulator 71 comprising a cylinder with a diametrically extending groove on its face. The outer end of the actuating shaft is connected to a presser plate 73 by means of a ball thrust bearing 74. The presser plate is in direct contact with a Sylphon bellows 75 positioned within the housing 51 which is jacketed and supplied with a constant stream of cooling liquid from the cooling system of the motor.

In this modified construction it is to be noted that the temperature responsive device is directly connected to the actuating shaft or pin. The modification first described is of advantage in some instances in that the overall length of the fan assembly and temperature sensitive controlling device is not as great as that of the modified form of device.

Instead of passing cooling liquid through the Sylphon or other thermostat housing, lubricating oil from the crankcase or well can be passed in heat exchange relationship to the thermostat which then actuates the fan blades. This adaptation is of use in large power units and on air cooled engines. The air cooled types can also be provided with a thermostat in direct contact with heads of the motor blocks, the pitch of the fan blades then being controlled by changes in motor block temperatures directly.

In all instances it is to be noted that the method of operation comprises varying the pitch of fan blades, which pass air through a cooling fluid radiator or around a motor, in accordance with the temperature of the motor or its cooling fluid.

Although in Fig. 1 the fan assembly is shown positioned between a motor and a radiator, it is to be understood that various modifications and changes from this illustrative arrangement can be made. For example, in certain types of vehicles the motor is positioned at a considerable distance from the radiator. In other instances the radiator is not only positioned at an appreciable distance from the motor but in addition the radiator may be at the rear of a vehicle and not at the front. Although in many installations the fan blades are inclined for the purpose of sucking air through the radiator, in other instances the inclination and direction of rotation of the fan blades may be such as to blow air through the radiator. If desired, the thermostat can be positioned directly within the fan hub. These and other changes and modifications will occur to those skilled in the art, who can readily adapt the general teachings of this invention to a variety of uses, situations and circumstances.

I claim:

1. In a device of the character described, the combination of a hollow stationary stud shaft, a hollow hub rotatable thereon, an actuating pin slidable in the stud shaft and extending into the hub, a collar slidably mounted within said hub and rotatable therewith, said collar being provided with an annular outer groove, a bearing connecting said collar and actuating pin, radially extending fan blade studs rotatably journaled in the hub, a cap member provided with an eccentrically positioned pin carried by the inner end of each stud, said pin extending into the annular groove of said collar, a fan blade attached to each of said studs, each blade being provided with an entering edge portion curved with respect to the trailing edge portion, the rotational axis of each stud extending along each fan blade through points in the rear half of the width of the blade, measured from its trailing edge, and a temperature responsive, pressure generating means associated with said actuating pin for moving the same and varying the pitch of said fan blades.

2. In a device of the character described, the combination of: a stud shaft, a rotatable hollow hub on said shaft, said hub being provided with a plurality of radially extending bosses, a radially extending stepped bore in each of said bosses, a fan blade stud rotatably journaled in each bore, a retaining cap threadedly attached to each of said bosses and cooperating with the stud positioned therein, an eccentrically positioned pin carried by the inner end of each stud, a collar member movable axially of said shaft and extending into said hub and provided with groove means adapted to receive said pins, a fan blade carried by each of said studs, each blade being provided with an entering edge portion curved with respect to the trailing edge portion, the rotational axis of each stud extending along its associated fan blade through points in the rear half of the width of the blade; and a temperature responsive, pressure generating means connected to said collar member for moving the same to vary the pitch of said studs and fan blades carried thereby.

3. In a device of the character described, the combination of: a stud shaft, a rotatable hollow hub on said shaft, said hub being provided with a plurality of radially extending bosses, a radially extending stepped bore in each of said bosses, a fan blade stud rotatably journaled in each bore, bearings within each bore cooperating with stepped portions of the bore and the stud therein, an eccentrically positioned pin carried by the inner end of each stud, a collar member movable axially of said shaft and extending into said hub and provided with groove means adapted to receive said pins, a fan blade attached to each of said studs, the rotational axis of each stud extending along its associated fan blade through points in the rear half of the width of the blade, each blade being provided with a substantially flat body portion and a curved entering edge portion, the curvature existing in less than one-third of the total width of the blade; and a temperature responsive, pressure generating means connected with said collar member for moving the same to vary the pitch of said studs and fan blades carried thereby.

DAVID BRAINARD DEWEY.